United States Patent
Garland

[11] Patent Number: 5,842,553
[45] Date of Patent: Dec. 1, 1998

[54] SELF PROPELLED WETLAND CONVEYOR DEVICE

[76] Inventor: Thomas Martin Garland, 2378 Diehl Dr., Tallahassee, Fla. 32308

[21] Appl. No.: 538,121

[22] Filed: Oct. 2, 1995

[51] Int. Cl.$^6$ ................................................ B65G 41/00
[52] U.S. Cl. ...................... 198/316.1; 198/317; 198/318; 198/861.4
[58] Field of Search ..................... 198/304, 311, 198/312, 315, 316.1, 317, 318, 861.4

[56] References Cited

U.S. PATENT DOCUMENTS

| | | | |
|---|---|---|---|
| 1,423,878 | 7/1922 | Potter et al. | 198/861.4 |
| 1,804,286 | 5/1931 | Speno | 198/861.4 |
| 3,863,783 | 2/1975 | Spellman | 198/312 |
| 4,206,840 | 6/1980 | Hanson | 198/316.1 |
| 4,345,680 | 8/1982 | Kay | 198/311 |
| 4,350,241 | 9/1982 | Wenzel | 198/318 |
| 4,363,725 | 12/1982 | Morita et al. | 209/257 |
| 4,379,672 | 4/1983 | Hunter | 198/316.1 |
| 4,590,739 | 5/1986 | Abatti et al. | 53/391 |
| 4,965,993 | 10/1990 | Butler et al. | 56/327.1 |

*Primary Examiner*—Joseph E. Valenza
*Attorney, Agent, or Firm*—Carnes, Cona, Dixon

[57] ABSTRACT

The present invention is a device designed to assist in the transport of sediments and debris in storm water holding facilities, swamps, bogs or similar environments. The device is self propelled and remote controlled. The device is fed material by a mechanical hoe or by workers in the wetlands and transports the debris and sediments by conveyor belt to a truck or solid ground. When the area is cleared the device moves, by remote control, along the endless track to a new location.

19 Claims, 9 Drawing Sheets

SELF PROPELLED WETLAND CONVEYOR DEVICE

BACKGROUND OF THE INVENTION

1. Field of the Invention

The present invention relates generally to a device designed to convey objects over wet or boggy ground and more particularly to self propelled wetland conveyor device designed to assist in the transportation of sediments and debris in storm water facilities, swamps, bogs or similar environments and which is controlled by an operator by way of a remote. The device of the present invention is adapted to remove the sediments and debris via a conveyor belt which feeds the objects to a waiting waste dump, truck or the like.

2. Description of the Prior Art

Traditionally, persons have sought to remove sediments and debris from soggy ground or wetlands for a variety of reasons; the objects removed have been rocks, trash, sediments, or excess vegetation. The method used for removing these debris has been to have workers or a mechanical hoe move through the area in question and dig up the sediments and debris and place the sediments and debris in a truck. When filled the truck was driven to a dump or base station and emptied. The traditional methods have many draw backs the most prominent of which is that trucks are not specifically designed to move over soggy ground or wetlands. Further trucks require a driver and persons to stand on the truck bed and receive the debris, if collected by hand. Accordingly, effort has been expended to improve this system.

Such a device is disclosed in U.S. Pat. No. 4,363,725 issued to Morita et al. Morita et al. disclose a self propelled apparatus that is used to remove stone and gravel from excavated soil. This device consists of a first conveyor belt, which guides the excavated soil and gravel to the sieving area, and a second conveyor which aids in the transportation of the soil and gravel through the sieving mechanism. This device, though efficient in removing stone and gravel from excavated soil, does suffer some drawbacks. The combination of sieve mechanism, a first conveyor and a second conveyor provides for an apparatus that is bulky, difficult to maneuver, and expensive to operate. Additionally, this apparatus is not designed nor configured to travel through wetlands or the like.

Another device is disclosed in U.S. Pat. No. 4,590,739 issued to Abatti et al. Abatti et al. disclose a self propelled crop harvester which includes wing conveyors. The wing conveyors received the picked crop (i.e. melons, squash, or the like) and transport these items to a processing area. Though efficient, this harvester does include some shortcomings. The apparatus disclosed still requires individual to pick up the crop and load the items onto the wing conveyor. This task is time consuming and is also strenuous on the individual. Further, Abatti et al. utilizes trucks or the like thereby providing for a device that is not applicable for wetlands or the like. In addition, Abatti et al. provides for an apparatus that requires the use of several employees, including at least one driver for the truck, or the like, in order to successfully employ the apparatus.

Another device is disclosed in U.S. Pat. No 4,965,993 issued to Butler et al. which discloses a crop harvester for vine crops. The harvester includes an operator station and a conveyor belt that is adapted to receive and transport the vine crops. This harvester further includes vine cutters that are anchored to caster wheels. The design and configuration of the harvesters disclosed in Bultler is al. provides for a device that is not versatile, and as such cannot be utilized in wet ground.

None of these previous efforts provide the benefits intended with the present invention. Additionally, prior techniques do not suggest the present inventive combination of component elements as disclosed and claimed herein. The present invention achieves its intended purposes, objectives and advantages over the prior art device through a new, useful and unobvious combination of components which are simple to use, utilizes a minimum number of functioning parts, at a reasonable cost to manufacture, assemble, and by employing only readily available materials.

SUMMARY OF THE INVENTION

The present invention provides for a self propelled wetlands conveyor device that is adapted to move sediments and debris over wet or boggy ground. The device of the present invention is self propelled on an endless track and can be controlled via a remote control unit.

Located above the endless track is the frame or chassis. This frame or chassis will support the transport unit. The transport unit comprises of a turntable and a hydraulic system. This transport unit also engages a conveyor belt system that is adapted to receive and transport the collected debris and sediment. The conveyor belt can be raised, lowered, and angularly altered via the hydraulic system while the turntable will permit for the rotational movement of the conveyor belt system.

Accordingly, it is the object of the present invention to provide for a self propelled wetland conveyor device that can be operated via a remote control unit and that is adapted to adequately, cost effectively, and sufficiently remove debris, sediment, and the like from storm water facilities, swamps, bogs, or the like, while utilizing a minimal amount of labor.

It is an another object of the present invention to provide for a self propelled wetland conveyor device that includes an endless track that is designed and configured for multi-terrain use for enabling successful mobility of the device in any type of environment.

It is yet another object of the present invention to provide for a self propelled wetland conveyor device that includes a conveyor system that is adapted to continuously collect and transport debris and the like as well as providing for the device to include capabilities that will enable the height, incline, and rotational location of the convey to be adjusted for rendering the optimum means for collecting and removing the undesired material.

A final object of the present invention is to provide a device in accordance with the preceding objects and which will increase the efficiency of clearing sediments and debris from bogs, swamps, and storm water holding ponds; conform to conventional forms of manufacture, be simple to construct and easy to use so as to provide a device that will be economically feasible, long lasting and relatively trouble free in operation.

Although there have been many inventions related to self propelled conveyor systems, none of the inventions have become commonly used. The present invention meets the requirements of simplified design, low initial cost, low operating cost, and it requires only a minimal amount of training to successfully employ the invention.

The foregoing has outlined some of the more pertinent objects of the invention. These objects should be construed to be merely illustrative of some of the more prominent features and applications of the intended invention. Many other beneficial results can be obtained by applying the disclosed invention in a different manner or modifying the invention within the scope of the disclosure. Accordingly, a fuller understanding of the invention may be had by referring to the detailed description of the preferred embodiments in addition to the scope of the invention defined by the claims taken in conjunction with the accompanying drawings.

BRIEF DESCRIPTION OF THE DRAWINGS

Similar reference numerals refer to similar parts throughout the several views of the drawings.

DESCRIPTION OF THE PREFERRED EMBODIMENTS

As illustrated through the various views of the drawings (FIGS. 1–8), the self propelled conveyor device 20 of the present invention comprises a support frame 9 and a conveyor belt system 22.

As illustrated in FIG. 1, 2, 4a–4d, 7, and 8 the support frame 9 is provided with endless tracks 10 which allow the device 20 to be self-propelled. The endless tracks can include treads or cleats in order to provide for a multi-terrain device which can be adequately utilized in any environment, including wet or boggy ground.

The endless tracks engage rollers 24. These rollers 24 are powered via a first motor (not illustrated). This will enable the device 20 to move in a desired direction once the rollers 24 are rotating, inherently causing the endless track to rotate. This motor is powered by the power unit 14 which is mounted on the support frame 9. This power unit 14 is a hydraulic system and includes a pump that is power via a second motor. This second motor can be a diesel, gasoline, or electrically operated motor.

Figure 1:
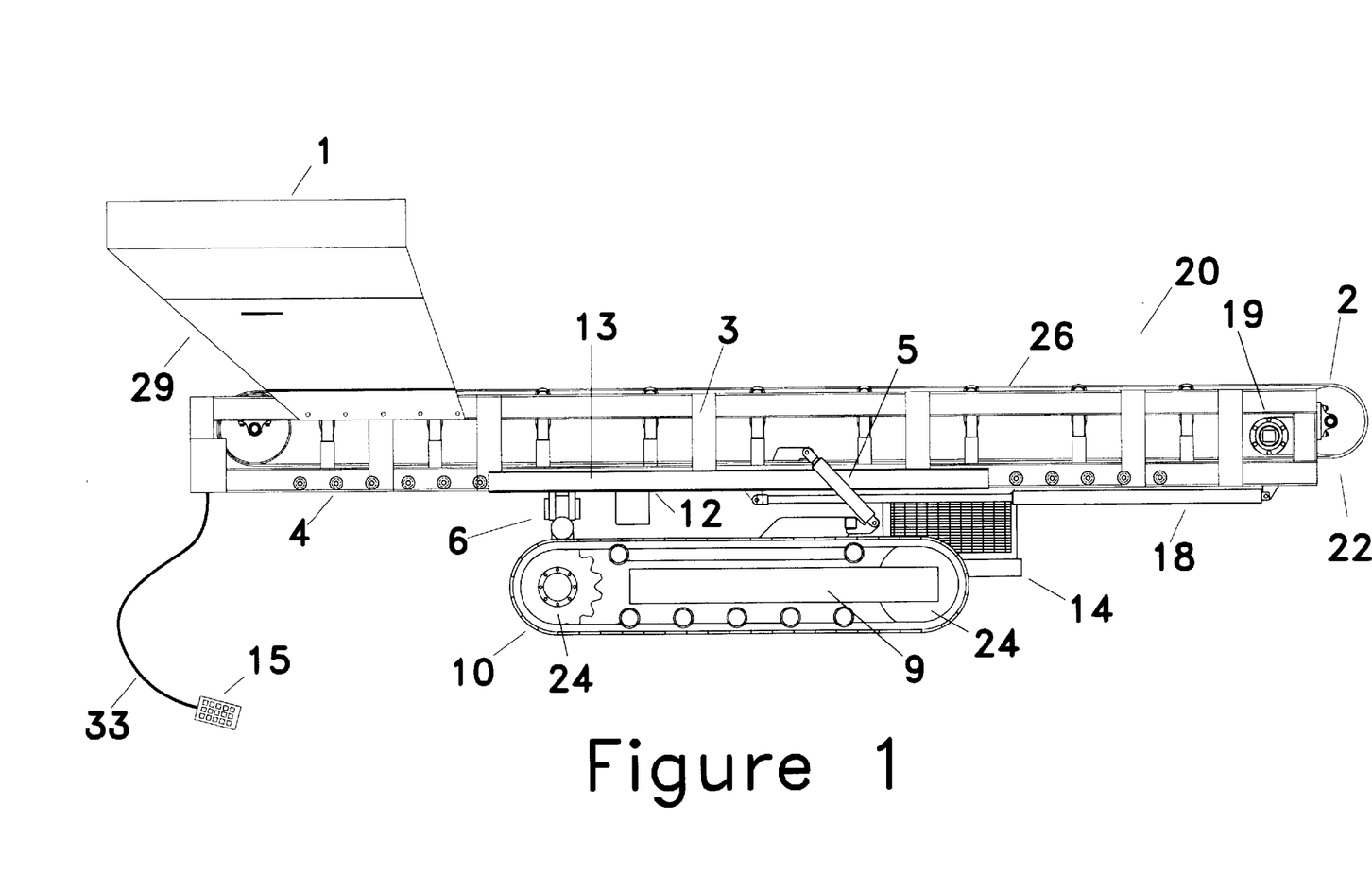
FIG. 1 is a side planar view of the self propelled conveyance device of the present invention.
Figure 2:
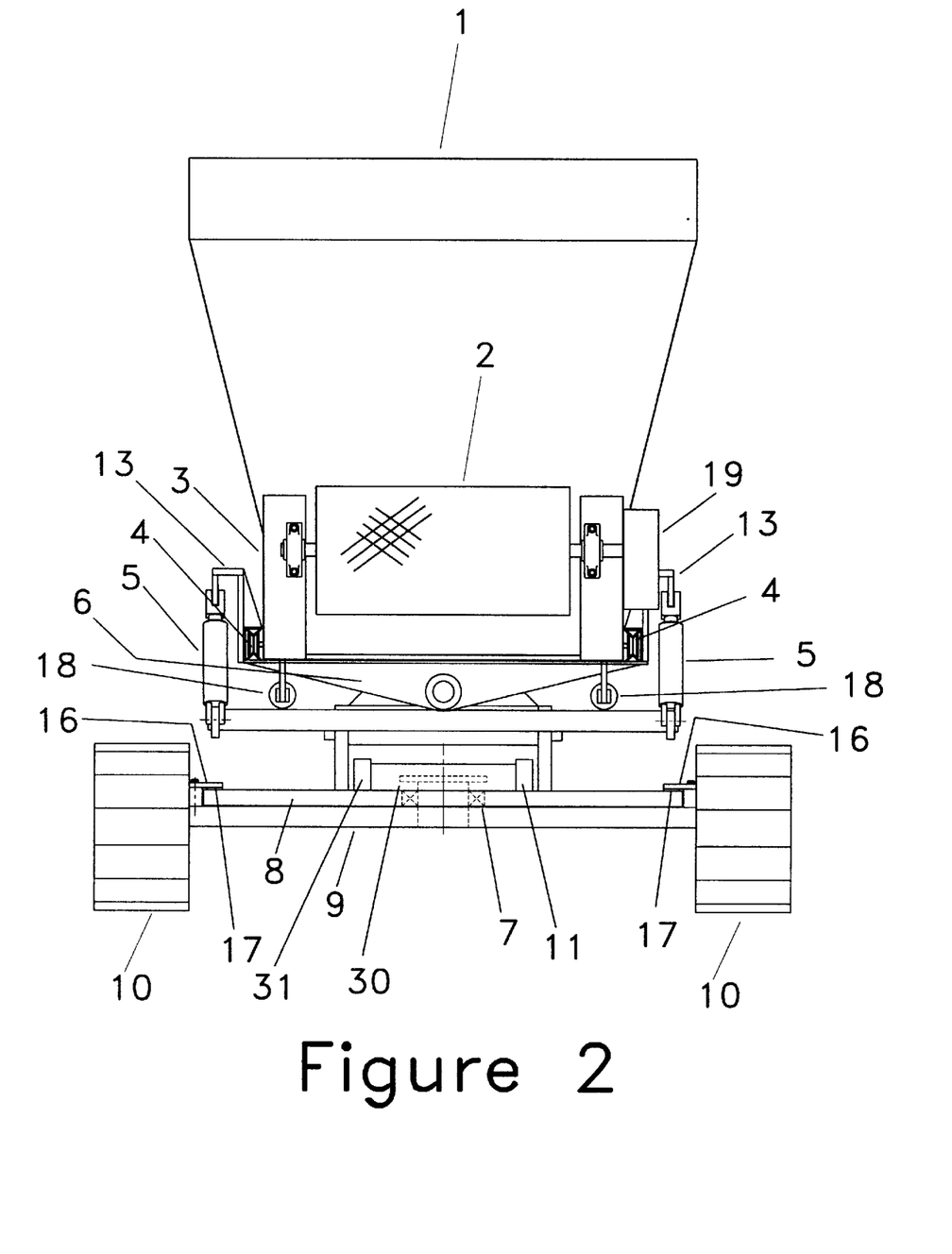
FIG. 2 is a back planar view of the self propelled conveyor device of the present invention.
Figure 3A:
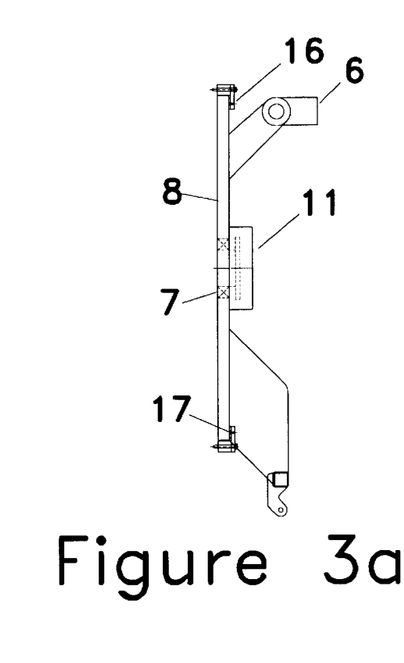
FIG. 3a is a front planar view of the hitch assembly used in the self propelled conveyor device of the present invention.
Figures 3B, 3C:
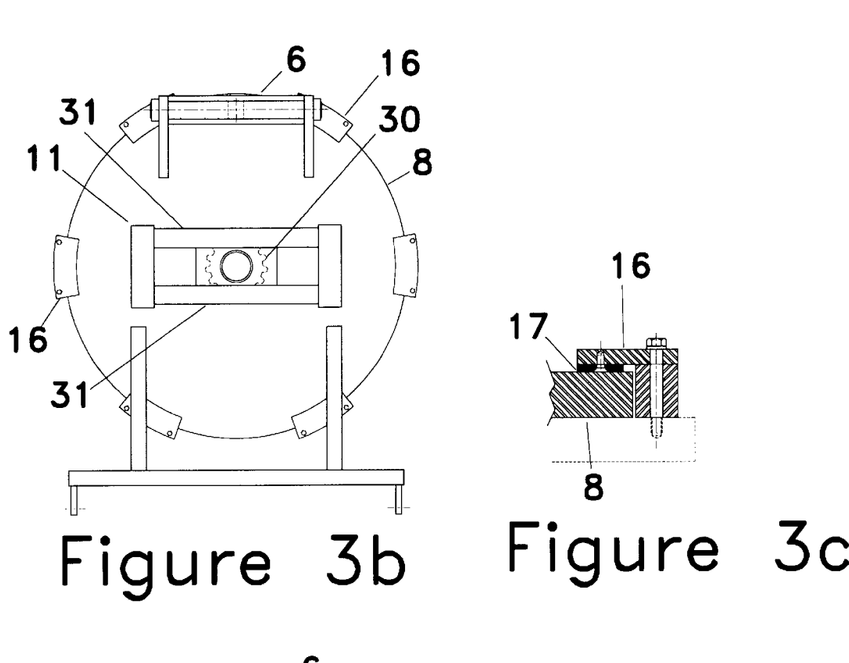
FIG. 3b is a top planar view of the turntable bearing assembly and turntable plate used in the self propelled conveyor device of the present invention. turntable plate.
FIG. 3c is an enlarge planar view of the support joint of the support frame used in the self propelled conveyor device of the present invention.
Figure 3D:
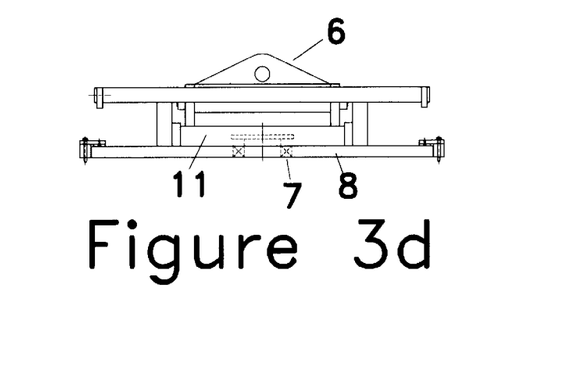
FIG. 3d is a side planar view of the turntable bearing assembly and the turntable plate used in the self propelled conveyor device of the present invention.
Figure 4A:
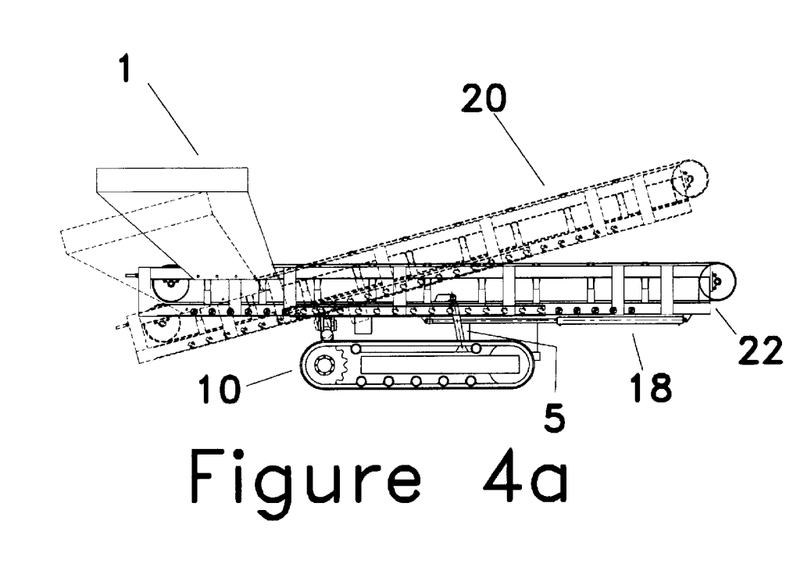
FIG. 4a is a detail view illustrating the vertical adjustment system for the conveyor system used in the self propelled conveyor device of the present invention.
Figure 4B:
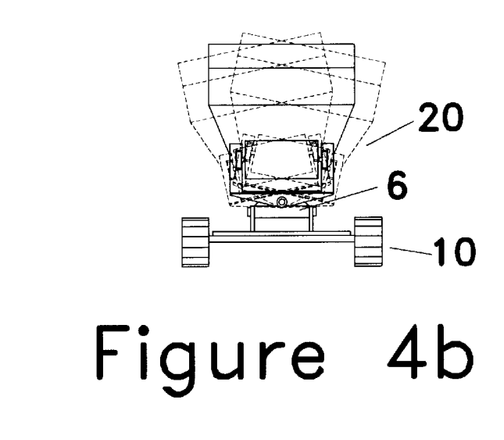
FIG. 4b is a detail back view of the self propelled conveyor device of the present invention illustrating the leveling hydraulic system.
Figure 4C:
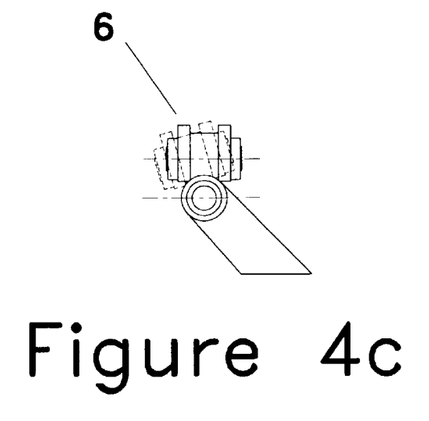
FIG. 4c is an exploded side view of the hitch assembly used in the self propelled conveyor device of the present invention.
Figure 4D:
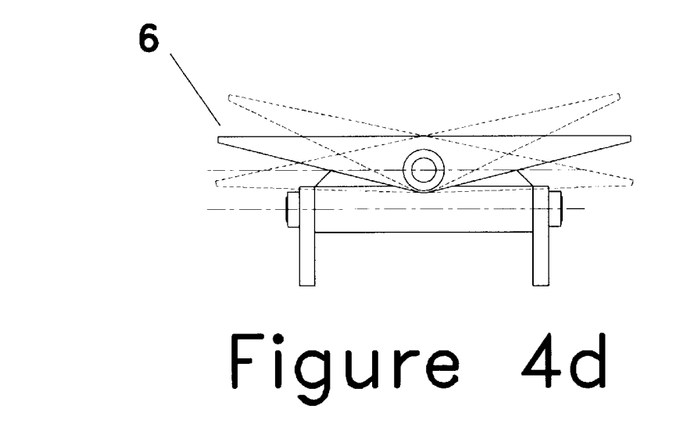
FIG. 4d is an explode back view of the hitch assembly used in the self propelled conveyor device of the present invention.
Figure 5:
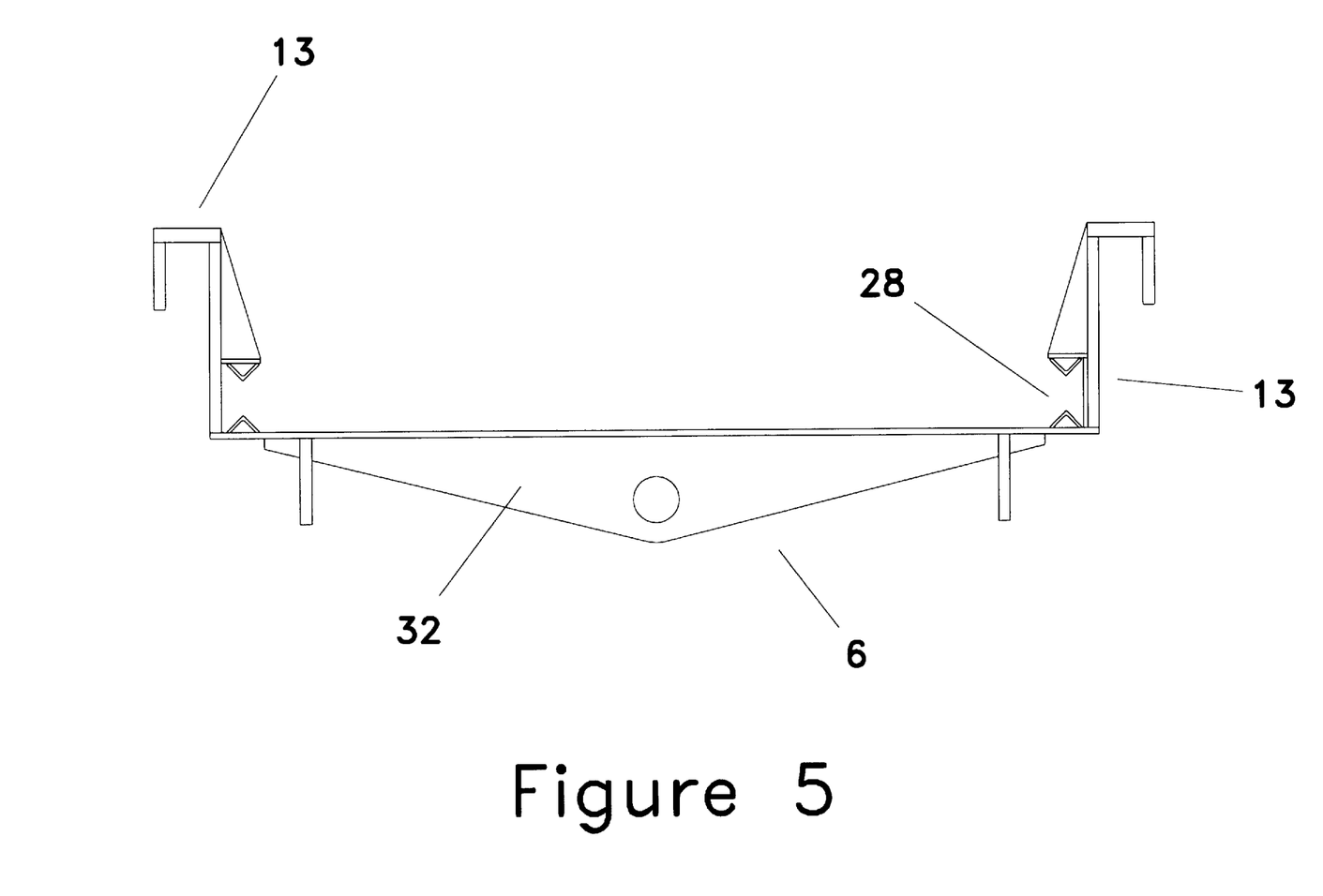
FIG. 5 is a rear planar view of the lateral slide frame used in the self propelled conveyor device of the present invention.
Figure 6A:
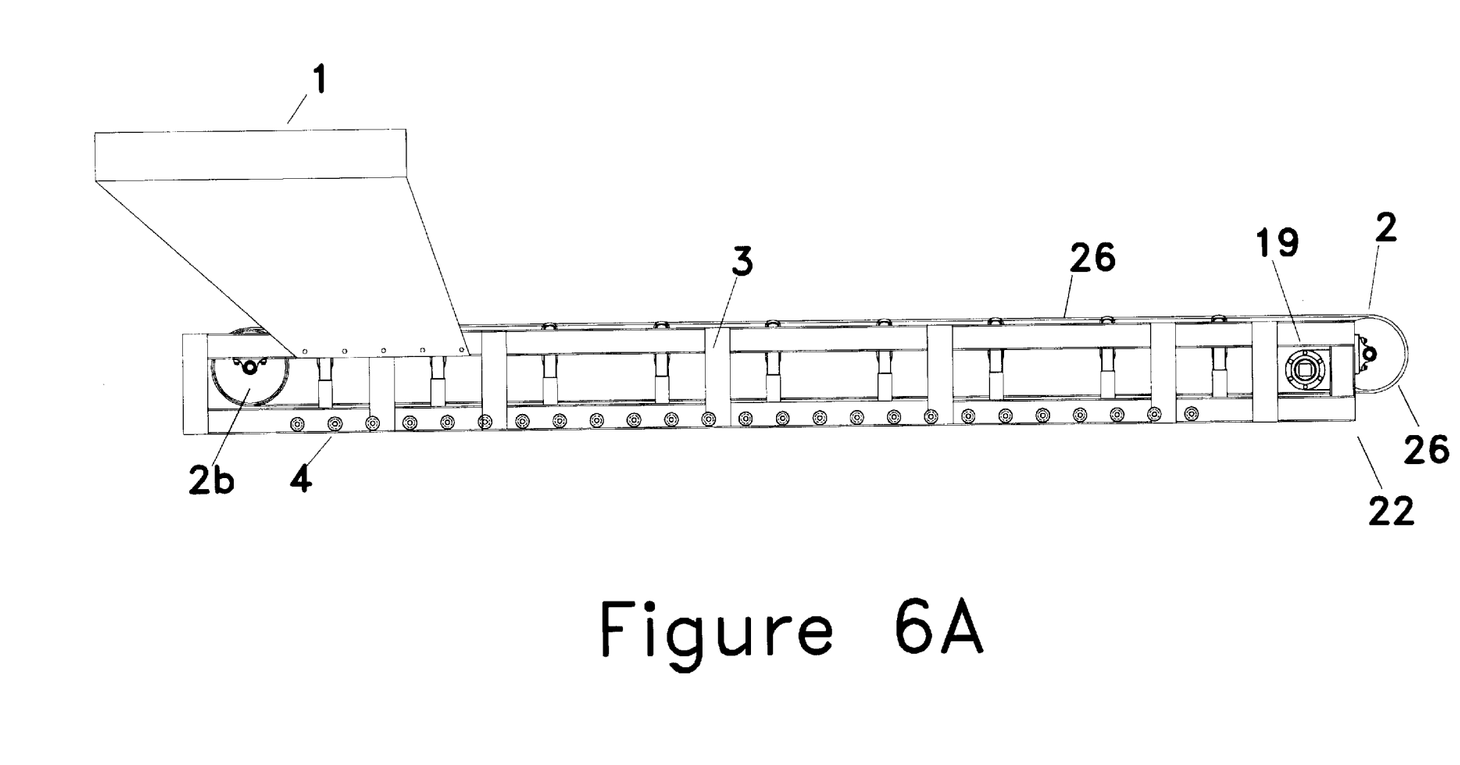
FIG. 6A is a side planar view conveyor belt system used in the self propelled conveyor device of the present invention.
Figure 6B:
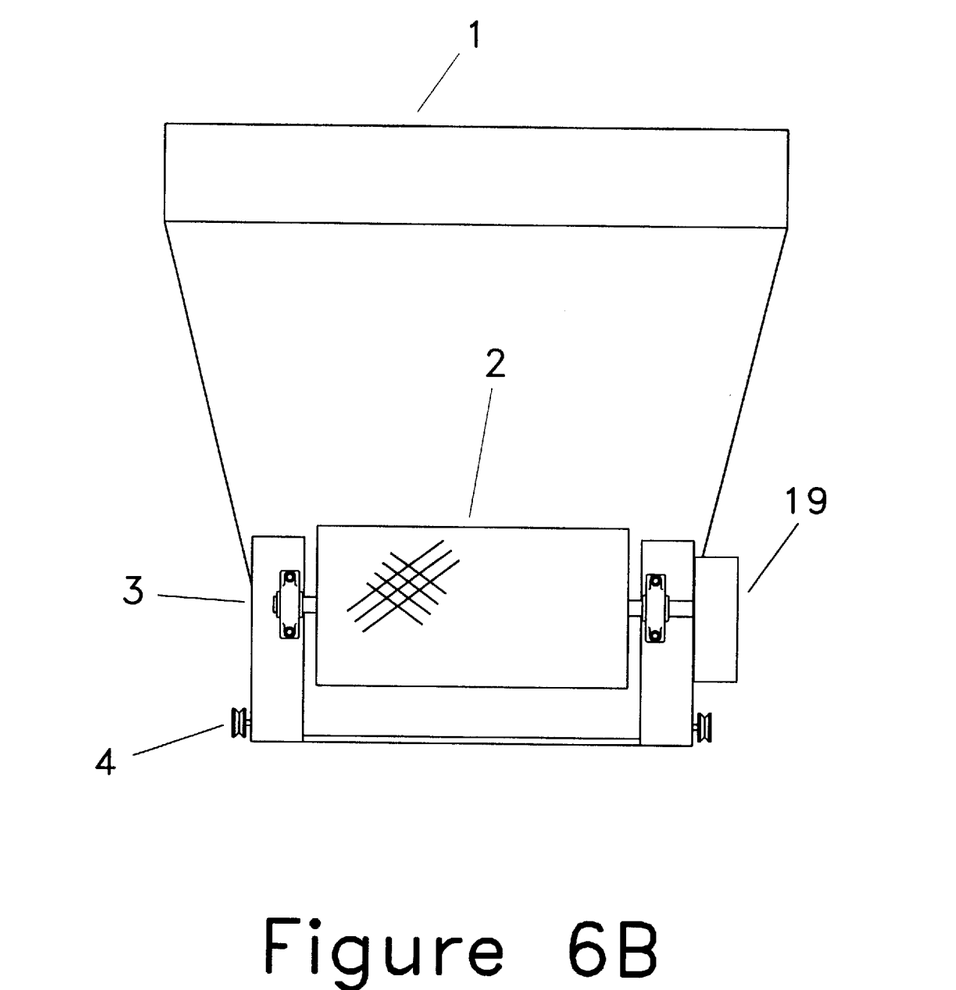
FIG. 6B is a front planar view of the conveyor belt system used in the self propelled conveyor device of the present invention.
Figure 7:
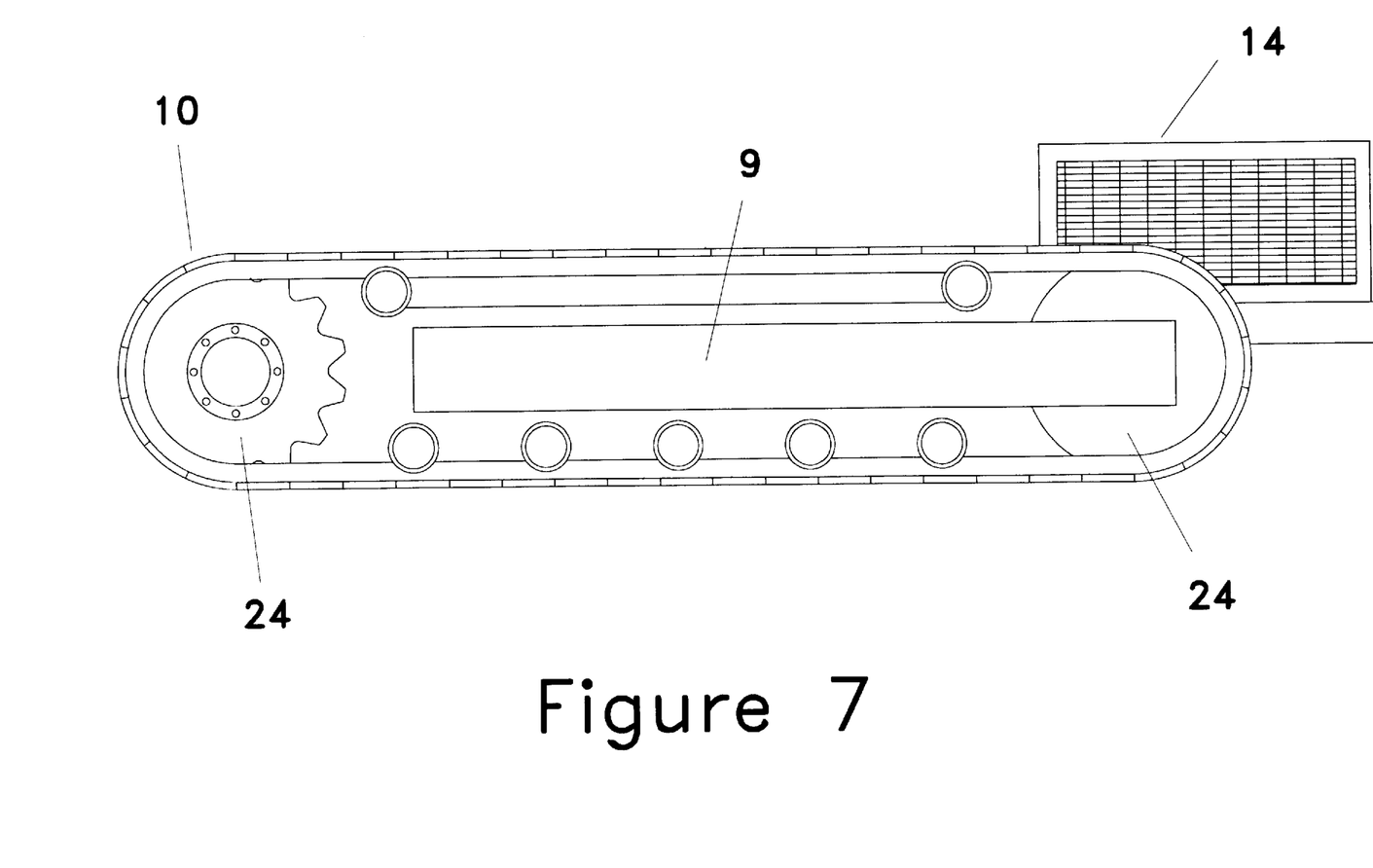
FIG. 7 is a side planar view of the vertical adjustment and leveling hydraulic cylinder used in the self propelled conveyor device of the present invention.
Figure 8:
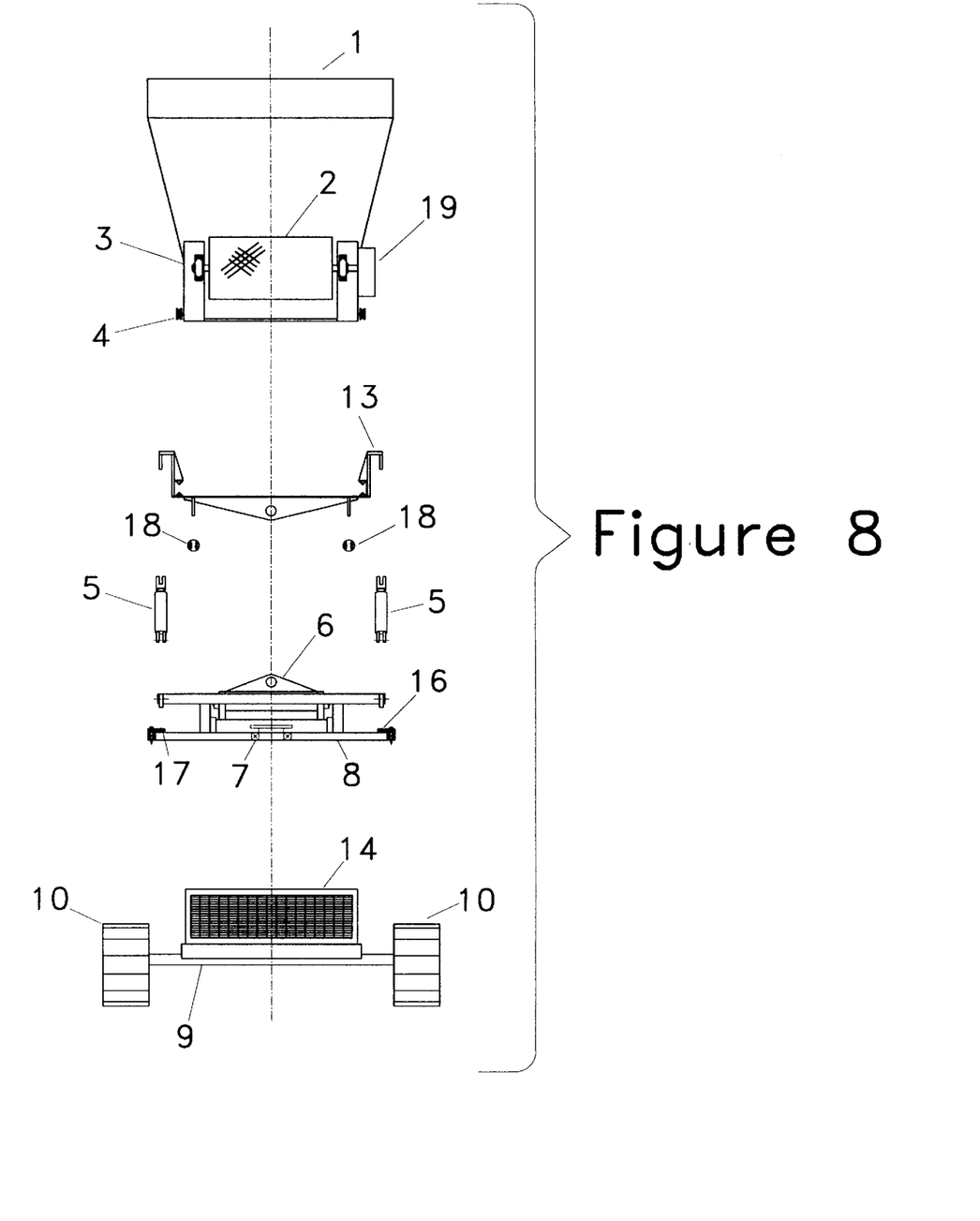
FIG. 8 is a front planar view of the components of the self propelled conveyor device of the present invention prior to assembly.

The support frame 9, illustrated in FIGS. 1 and 2, is located between the endless tracks 10. This support frame maintains the transport assembly. The transport assembly enables the vertical, horizontal, angular, and rotational movement of the conveyor belt assembly 22. Thereby, the transport assembly includes a height adjusting means, an angularly adjusting means, and a rotational adjusting means.

Secured above the frame 9 and between the endless track 10 is the conveyor belt assembly 22. The conveyor belt assembly 22, as seen in FIGS. 1, 2, 4a–4d and 6a–8, includes a conveyor frame 3.

Located in the proximity of the front end or delivery end of the conveyor frame 3 is a first or header roller 2a, while located in the proximity of the back end or receiving end of the conveyor frame 3 is a second roller or footer roller 2b.

A standard conveyor belt 26 extends around the header roller 2a and the footer roller 2b. This conveyor belt can be fabricated from a mesh material, so as to provide for a conveyor that includes a plurality of perforations. This will enable the desired material, i.e. water, to escape while enabling the non-desired material, i.e. debris or the like, to remain on the conveyor. It is noted that the sized and shape of the perforations, if used, can be designed so as to conformed to the particular item to be removed.

The rollers (2a, 2b) are controlled and powered by the conveyor belt drive assembly 19. This conveyor belt drive assembly 19 includes a third motor and a gear box. Hence the activation of the motor will provide for the activation of the first and second rollers via the drive belt. The use of the gear box will enable the motor to step up or to step down, when necessary, in order to provide for an adequate amount of torque for enabling the transportation of items regardless of weight and size. This conveyor belt drive assembly is powered via the power unit 14.

Extending outwardly from the conveyor frame are a plurality of evenly spaced and laterally aligned rollers 4. These rollers 4 are used to assist the relocation or repositioning of the conveyor assembly 22. Secured to the conveyor frame 3 and in the proximity of the back end of the frame 3 is a loading hopper 1. This loading hopper 1 extends upwardly from the conveyor frame 3 and will permit the loading of the material onto the belt 26. As seen in FIG. 1, the loading hopper 1 can includes an access door 29 which is located on one of the side walls of the hopper. This access door 29 will enable the user an easier means of depositing items onto the assembly. As illustrated in FIG. 1, the access door 29 is hingedly secured to the side wall of the hopper.

Located above the upper surface of the support frame 9 is the turntable plate 8. This turntable plate is designed to rotate. This turntable plate constitutes the rotational adjusting means. This turntable plate is illustrated in further detail in FIGS. 2 and 3a–3d. As shown, attached to the upper surface of the turntable plate 8 via bearings 7 is a sun gear 30. Hydraulic cylinders 31 engage the teeth of the sun gear 30. This will provide for the sun gear and the cylinders to act as the turntable plate actuator 11.

A plurality of clamps 16 are used to assists in maintaining the turntable plate 8 on the support frame 9. Anti-friction pads 17 are located between the turntable plate 8 and the clamps 16 in order to provide protection to the plate 8 and clamps 16 and can also be utilized as a damper in order to absorb vibrations of the device 20.

Attached to the lower surface of the conveyor frame 3 is a hitch assembly 6. This hitch assembly, seen in FIGS. 1–5 and 8, will enable the conveyor assembly 22 to be adjusted to a desired position or location. Accordingly, the hitch assembly 6 is part of the transport assembly and is also designed and configured to maintain the conveyor assembly 22.

A lateral slide frame 13 is secured to the hitch 6 via an extension 32. This extension, once secured, is considered a component of the hitch assembly 6. As seen in FIGS. 1, 2, 4a–4d and 8, the lateral slide frame 13 further includes a receiving means 28 that is adapted to receive and maintain guide rollers 4. Affixed to the lateral guide frame and the turntable hold down clamp 16 are hydraulic cylinders 5. These hydraulic cylinders 5 are used for the adjustment of the tilt angle of the conveyor assembly 22. A leveling switch is used to level the assembly, thereby providing a means of raising the height while enabling the conveyor assembly to remain in a horizontal position with respect to the ground. Thereby, the hydraulic cylinders constitute a height adjusting means and an angularly adjusting means.

Horizontally secured on the lateral slide frame 13 are horizontal hydraulic cylinders 18. These horizontal hydraulic cylinders 18 are used to adjust the horizontal positioning of the conveyor assembly 22. The horizontal hydraulic cylinders constitute a horizontal positioning means.

It is noted that the combination of the hitch 6, turntable assembly, hydraulic cylinders 5, horizontal cylinders 18, and lateral slide frame 13 provide for transport assembly.

The device can be controlled and operated via a remote control panel device 15. This remote control panel 15 device may be connected to the device 20 by way of a cable 33. By utilizing a remote control panel device 15 will eliminate the need to use a driver for operating the apparatus 20.

For utilizing the device, a user or operator would activate the device via the remote control panel device 20. This enables the device to be transported to a desired location or designation via the endless tracks 10. These endless tracks 10 move once the rollers are rotating. Once the device 20 is at a desired location, adjustments can be done to the conveyor assembly 22. This adjustment will permit for the conveyor assembly 22 to be lifted, lowered, tilted, rotated, or horizontally adjusted.

Once adjusted, the conveyor assembly is activated to provide for continuous movement of the conveyor belt. This will permit for the optimum utilization of the apparatus of the present invention 10. The undesired items will be loaded into the hopper 1 to permit for its transportation from the location of the footer roller to the header roller, and then to the desired location for removal and dumping.

While the invention has been particularly shown and described with reference to an embodiment thereof, it will be understood by those skilled in the art that various changes in form and detail may be made without departing from the spirit and scope of the invention.

I claim:

1. A self propelled wetland conveyor device comprising:
a frame;
a transport unit is secured to said frame;
a conveyor belt system engages said transport unit; and
said transport unit includes a height adjusting means, an angularly adjusting means, and a horizontal positioning means, and said height adjusting means, said angularly adjusting means, and said horizontal positioning means controls said conveyor belt system and provides said conveyor belt system to be raised, lowered, and angularly altered via said height adjusting means and moved in a forward or reverse direction via said horizontal positioning means.

2. A self propelled wetland conveyor device as in claim 1 wherein endless tracks are secured to said frame, and said endless tracks allows transportation of said transport unit for providing a portable device.

3. A self propelled wetland conveyor device as in claim 2 wherein said endless tracks further includes treads or cleats.

4. A self propelled wetland conveyor device as in claim 1 wherein said conveyor belt is fabricated from mesh material.

5. A self propelled wetland conveyor device as in claim 1 wherein said conveyor belt system includes a support frame and a hopper is secured to one end of said support frame.

6. A self propelled wetland conveyor device as in claim 1 wherein said transport unit further includes a rotational adjusting means and said rotational adjusting means comprises a turntable plate is located above said frame, said turntable plate is secured to said conveyor belt system via a plurality of clamps, a plurality of bearings secured a sun gear having teeth to said turntable plate, at least one hydraulic cylinder engages said teeth of said sun gear, and movement of said at least one hydraulic cylinder causes said sun gear to rotate for rotating said turntable plate.

7. A self propelled wetland conveyor device as in claim 6 wherein anti-friction pads are located between said turntable plate and said plurality of clamps for protecting said turntable plate and for absorbing vibrations of the device.

8. A self propelled wetland conveyor device as in claim 1 wherein a hitch assembly having a lateral slide frame is secured to said conveyor belt system, a pair of hydraulic cylinders are secured to said lateral slide frame and said conveyor belt system for enabling said conveyor belt system to be lowered, raised, and angularly adjusted, and said hydraulic cylinder constitutes said height adjusting means and said angularly adjusting means.

9. A self propelled wetland conveyor device as in claim 6 wherein a hitch assembly having a lateral slide frame is secured to said conveyor belt system, a pair of vertical hydraulic cylinders are secured to said lateral slide frame and two of said plurality of clamps, said vertical hydraulic cylinders enables said conveyor belt system to be lowered, raised, and angularly adjusted, and said vertical hydraulic cylinders constitutes said height adjusting means and said angularly adjusting means.

10. A self propelled wetland conveyor device as in claim 9 wherein anti-friction pads are located between said turntable plate and said plurality of clamps for protecting said turntable plate and for absorbing vibrations of the device.

11. A self-propelled wetland conveyor device as in claim 1 further includes at least one horizontal hydraulic cylinder, each cylinder includes a first end and a second end, said first end is frontwardly mounted to said conveyor belt system and said second end is secured to said frame, activation of said at least one horizontal hydraulic cylinder allows for said conveyor belt system to be displace horizontally, said at least one horizontal hydraulic cylinder constitutes said horizontal positioning means.

12. A self-propelled wet land conveyor device as in claim 8 wherein said horizontal displacement means comprises at least one horizontal hydraulic cylinder, each cylinder includes a first end and a second end, said first end is frontwardly mounted to said conveyor belt system and said second end is secured to said lateral slide frame, activation of said at least one horizontal hydraulic cylinder allows for said conveyor belt system to be displace horizontally.

13. A self-propelled wet land conveyor device as in claim 9 wherein said horizontal displacement means comprises at least one horizontal hydraulic cylinder, each cylinder includes a first end and a second end, said first end is frontwardly mounted to said conveyor belt system and said second end is secured to said lateral slide frame, activation of said at least one horizontal hydraulic cylinder allows for said conveyor belt system to be displace horizontally.

14. A self propelled wetland conveyor device as in claim 12 wherein a plurality of evenly spaced and laterally aligned rollers extend outwardly from said conveyor belt system, said lateral slide frame further includes a receiving means which receive said plurality of evenly space rollers, said receiving means and said evenly space rollers allow for a smooth horizontal transition when said at least one horizontal hydraulic cylinder is activated.

15. A self propelled wetland conveyor as in claim 5 wherein said hopper includes an access door.

16. A self propelled wetland conveyor as in claim 2 wherein said transport unit further includes a rotational adjusting means and said rotational adjusting means comprises a turntable plate is located above said frame, said turntable plate is secured to said conveyor belt system via a plurality of clamps, a plurality of bearings secured a sun gear having teeth to said turntable plate, at least one hydraulic cylinder engages said teeth of said sun gear, and movement of said at least one hydraulic cylinder causes said sun gear to rotate for rotating said turntable plate.

17. A self propelled wetland conveyor as in claim 16 wherein said height adjusting means and said angularly adjusting means comprises a hitch assembly having a lateral slide frame is secured to said conveyor belt system, a pair of vertical hydraulic cylinders are secured to said lateral slide frame and two of said plurality of clamps, said vertical hydraulic cylinders enables said conveyor belt system to be lowered, raised, and angularly adjust.

18. A self propelled wetland conveyor as in claim 17 wherein said horizontal displacement means comprises at least one horizontal hydraulic cylinder, each cylinder includes a first end and a second end, said first end is frontwardly mounted to said conveyor belt system and said second end is secured to said lateral slide frame, activation of said at least one horizontal hydraulic cylinder allows for said conveyor belt system to be displace horizontally.

19. A self propelled wetland conveyor as in claim 1 wherein said transport unit further includes a rotational adjusting means for allowing said conveyor belt system to rotate.

* * * * *